Jan. 14, 1947.                J. R. NALBACH                2,414,164
                                CONVEYER
                          Filed March 3, 1945            3 Sheets-Sheet 1
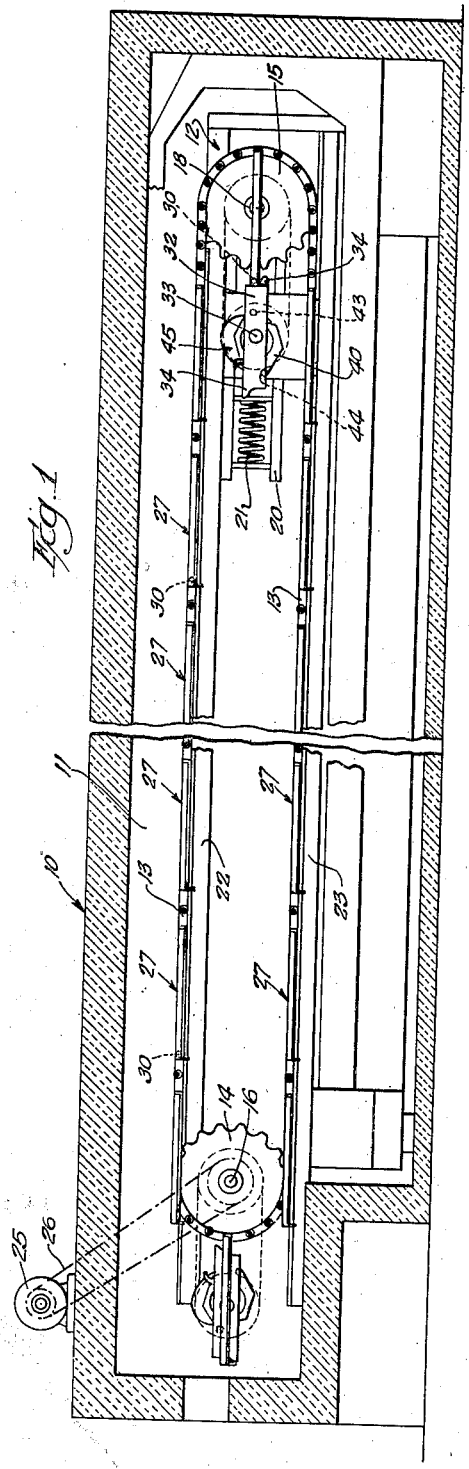
Inventor
John R. Nalbach
By Sheridan, Doris + Cargill
                Attys.

Jan. 14, 1947.   J. R. NALBACH   2,414,164
CONVEYER
Filed March 3, 1945   3 Sheets-Sheet 2
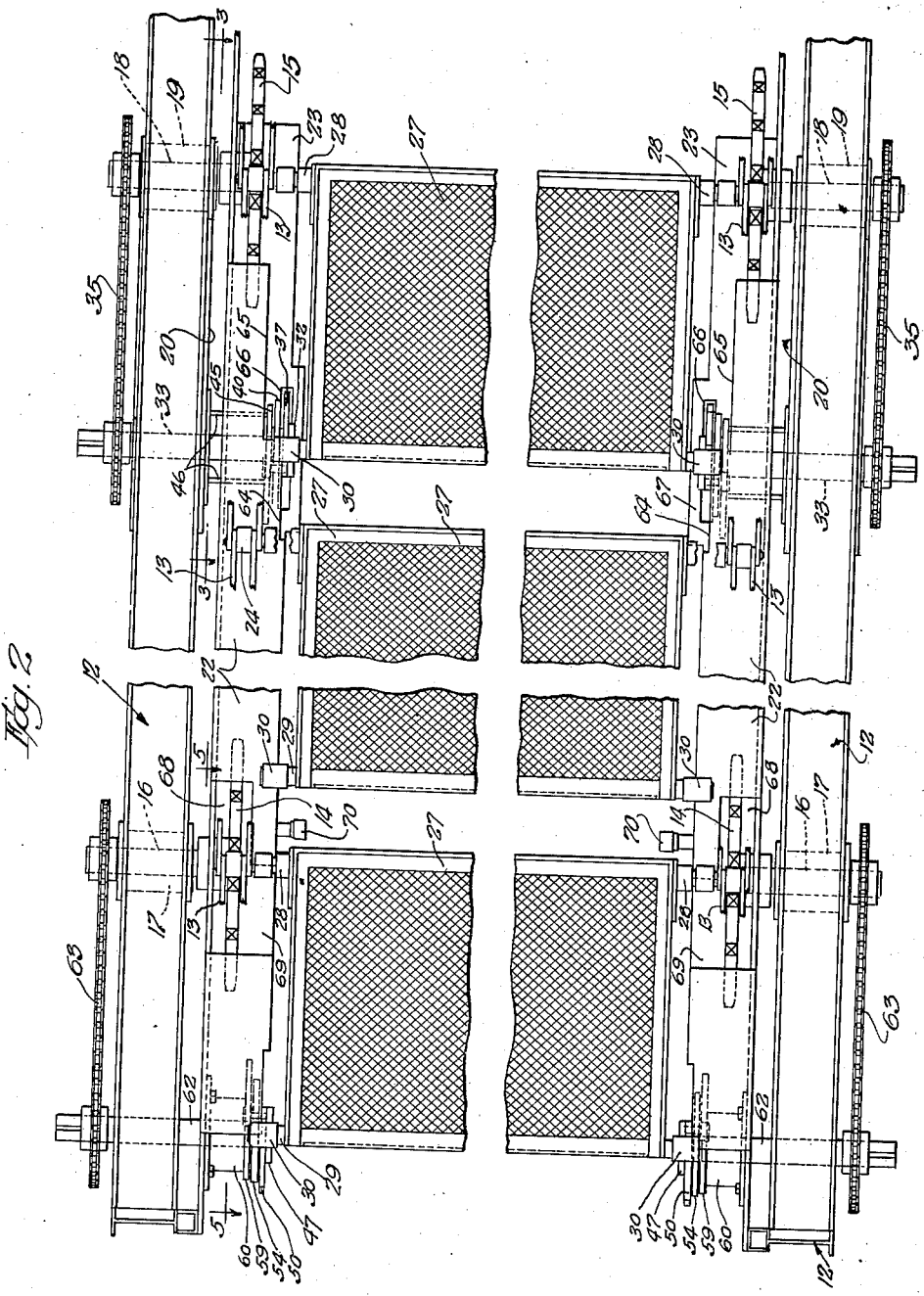
Inventor
John R. Nalbach
By Sheridan, Davis & Cargill
Attys.

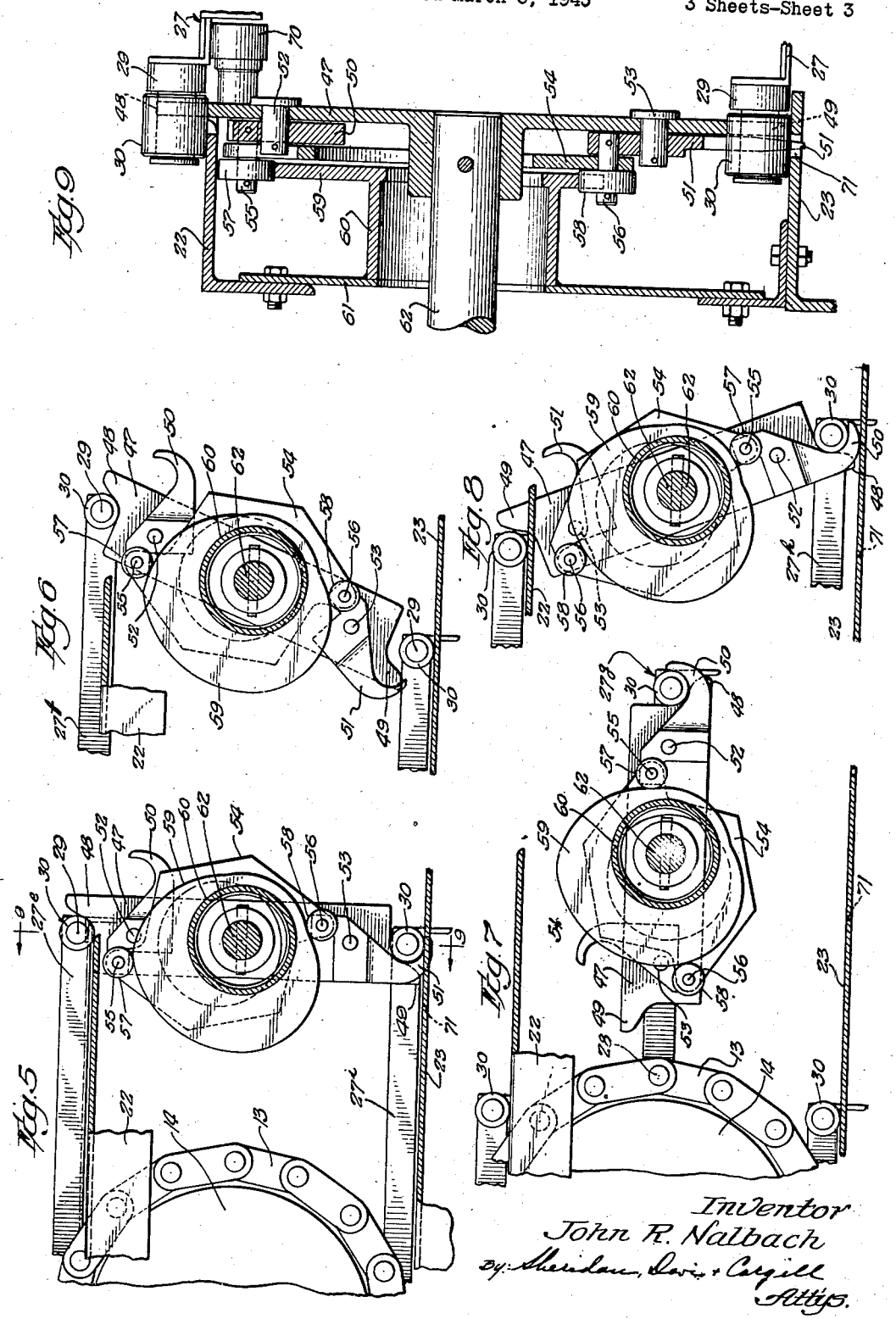

Patented Jan. 14, 1947

2,414,164

UNITED STATES PATENT OFFICE 2,414,164

CONVEYER

John R. Nalbach, Oak Park, Ill., assignor to Middleby-Marshall Oven Company, Chicago, Ill., a corporation of Illinois Application March 3, 1945, Serial No. 580,763

7 Claims. (Cl. 198—158)

The invention relates to improvements in conveyers.

One object of the invention is to provide an endless conveyer mechanism provided with improved means for stabilizing trays carried by the conveyer as the trays move arcuately about end sprockets of the mechanism. The mechanism herein shown and described is adapted for use in bake ovens of the so-called traveling type but the invention is not limited to such use.

In traveling ovens a pair of endless chains having horizontal runs and passing at the ends around sprockets generally are employed for moving trays within a baking chamber, which trays carry pans of products to be baked. The trays generally are attached pivotally to the chains and in stabilized tray ovens the trays are restrained from tilting during their passage within the baking chamber since tilting of the trays and the pans of dough or batter carried thereby produces final products that may be unshapely or non-uniform and hence less desirable commercially.

In effecting the stabilization of such pivotally supported trays, stabilizing mechanisms of various forms have been designed and some of which have been used commercially but not infrequently such mechanisms have comprised arcuate guiding track at the ends of the conveyers which, in conjunction with other apparatus, have been calculated to retain the trays in horizontal relation as the same move arcuately in succession from one horizontal run of the conveyer to the other. However, the movement of tray rollers along such arcuate tracks frequently is accompanied by irregularity in tray action, due possibly to imperfection or wear or misalignment of parts, and which doubtless is augmented by the changes in dimensions of the several parts due to the various temperature ranges under which commercial bake ovens necessarily are operated to baking various products.

It is an important object of the present invention to provide mechanism which, instead of moving tiltable ends of trays along curved tracks for stabilization purposes, actually carries or transports such tray ends during the arcuate movements thereof and thereby avoids the chattering and other irregularities in tray action above mentioned.

A more specific object of the invention is to provide tray stabilizing means that may be employed with equal facility at the forward and rear ends of a conveyer and that functions in like manner whether the conveyer moves in one direction or the other.

An additional object of the invention is to provide rotary means for transferring the swingable ends of pivoted trays of a conveyer in synchronism with the movement of the pivotal axes of the respective trays as the axes move arcuately about conveyer sprockets and means cooperating with the rotary transfer means affording positive engagement with the swingable tray ends whereby lengthwise shifting or other irregularity of movement of the trays is prevented during the transfer thereof from one horizontal run of the conveyer to the other.

A further object of the invention is to provide a wholly cam-controlled, tray-gripping mechanism for swingable ends of pivoted trays for effecting positive support of said tray ends by tray transfer means during those quadrants of movement of the latter during which axial shifting of the trays is most likely to occur.

Another object of the invention is to provide smoothly acting tray transfer mechanism adapted for use under temperature conditions, as in bake ovens, that renders the use of conventional lubricants as well as springs nonfeasible.

Other objects of the invention relate to various features of construction and arrangement of parts that will be apparent from a consideration of the following specification and accompanying drawings, wherein:

Fig. 1 is a broken vertical longitudinal sectional view of a bake oven comprising conveyer mechanism that is illustrative of the present improvements.

Fig. 2 is a broken top plan view illustrating the conveyer mechanism and certain baking chamber framing members that support the conveyer mechanism, the insulation of the walls and other features of the bake oven not essential to the present improvements being omitted.

Fig. 3 is an enlarged broken vertical sectional view taken on line 3—3 of Fig. 2.

Fig. 4 is a sectional view taken on line 4—4 of Fig. 3 but with the transfer arm assumed to be in upright position.

Fig. 5 is an enlarged broken vertical sectional view taken on line 5—5 of Fig. 2.

Figs. 6, 7 and 8, are broken views of the cam controlled apparatus shown in Fig. 4 and illustrates progressive positions of the mechanism during operation thereof.

Fig. 9 is a vertical sectional view taken on line 9—9 of Fig. 5.

In Fig. 1 a bake oven of the so-called traveling type is illustrated and generally, comprises a heat insulating inclosure 10 defining a baking chamber 11. The inclosure 10 comprises walls supported by suitable framing in the form of structural steel members, indicated generally in Fig. 2 by the numeral 12.

Disposed within the chamber 11 is a pair of endless chains 13 each having upper and lower horizontal runs and passing over sprockets 14 and 15 at the front and rear respectively of the conveyer.

The front sprockets 14, one at each side of the oven, may be mounted on a transverse shaft but, preferably, for the purpose of providing adequate vertical clearance between trays, the sprockets are mounted on stub shafts 16 each journalled in suitable bearings 17 supported by the frame 12.

The sprocket 15, at the rear of the oven, are carried on stub shafts 18 which are journalled in bearings 19 carried by horizontally slidable structures each indicated by the numeral 20 and which are supported by the framing members. The slidable structures 20 comprise springs 21 which urge the structures 20 to the right, as viewed in Figs. 1 and 2 for moving the shafts 18 and sprockets 15 to the right and thereby keeping the chains 13 taut during expansion of the chains and permitting sliding movement of the sprockets 15 and shafts 18 in the opposite direction during contraction of the chains in response to various temperature conditions affecting the same. The sliding structure is more fully shown in my Patent No. 2,369,840, granted February 20, 1945.

Secured to the inner vertical side walls of the baking chamber, as to the framing 12, are upper and lower horizontal tracks 22 and 23 at each side of the oven. The tracks are shown as formed of angle shaped steel members upon which the upper and lower horizontal runs of the chains are supported and along which they, in effect, roll by reason of the conventional rollers 24 provided on the link pins 24a of the chains. The conveyer, comprising the two chains 13 and other associated load handling mechanism, is driven by any approved means, as by a motor 25 shown on the top of the oven. The motor by means of a chain 26, drives the shaft 16 (if a single transverse shaft only is employed) or by two such chains 26 in the event two stub shafts 16 are provided, as preferred. The conveyer may be driven in either direction preferably, as by utilization of a reversible motor or by suitable reversing mechanism (not shown) in the driving means.

A plurality of trays 27 are shown which are movable by the chains 13 and upon which pans of bakery products to be baked may be placed for movement within the baking chamber. The trays 27 are shown secured to rear pivotal members 28 at opposite lateral edges of the trays, the members 28 constituting extended link pins by means of which the trays are attached to the chains. Such pins 28 are located at or adjacent the rear of the trays and hence the trays are swingable about the respective pins 28. The forward ends of the side walls of the trays are provided with laterally extended pins 29 which carry rollers 30 which are designed to engage the inner marginal portions of the respective tracks for supporting the trays in horizontal relation as the trays move with the chains during the horizontal runs of the latter. The rollers 30 extend inwardly of the inner margins of the respective tracks for engagement by transfer mechanism hereinafter described.

As a tray 27, such as the tray identified as 27a in Fig. 3 approaches the sprockets 16 at the rear end of the conveyer, the rear pivotal members 28 thereof will be carried arcuately about the sprockets to the upper run of the conveyer, assuming that the sprockets are moving in a clock-wise direction. For the purpose of maintaining the trays 27 in horizontal relation as the rear pivotal ends are moved about the sprockets 16, rotary transfer means are provided which engage the forward ends of the trays and move them arcuately concurrently with the movement of the rear ends, and release such forward ends for horizontal rolling movement upon the respective upper tracks upon completion of such arcuate movement.

The transfer means shown comprises rotary transfer arms 32 which are carried by stub shafts 33. Shafts 33 are suitably journalled in bearings carried by the respective sliding structure 20 and hence the spaced relation of the shafts 33 with respect to the sprocket shafts 18 is maintained during shifting of the latter due to expansion or contraction of the chains. The spacing of the shafts 33 from the shafts 18 is such that the transfer arms 32 will cooperate with the sprockets in retaining the trays in horizontal relation during the arcuate movement of the trays. The arms 32 are shaped at the ends to provide receiving means for rollers 30 and as shown are provided with fingers or extensions 34. The shafts 33 are shown in Fig. 2 as being driven in synchronism with the shafts 18 by chains 35.

As the tray, identified as 27a in Fig. 3 moves to the left from the position therein shown to the position of the tray identified as 27b, it will be seen that the lower finger 34 of arm 32 will have been moved into contact with the roller 30 of the tray. It will be understood that a transfer mechanism is provided at each side of the rear portion of the oven and that they operate in synchronism and hence but one only will be described. However, any lifting action exerted by the finger on the roller 30 of the tray 27b will not be effective in retaining the tray horizontal, if in fact the finger will produce any initial elevation of the forward end of the tray when the latter is in the position of tray 27b. It has been common practice heretofore to provide auxiliary means for cooperating with the transfer arms at this point, such as curved arcuate tracks along which the rollers 30 are forced by the fingers 34 and other associated mechanisms. Such curved tracks and associated mechanisms are dispensed with by the present improvements since in many instances the arcuate movements imparted to the trays were irregular, or jerky, whereas operation free of vibration is desirable not only from the standpoint of durability but from the standpoint of uniformity in finished products. Hence, instead of a rolling transfer movement at the forward end of the trays, said ends are actually transported bodily from one run to the other similarly to the rear ends. The improved means for effecting the engagement of the forward tray ends and effecting the transfer from one run of the conveyer to the other will now be described.

As shown in Fig. 3, the transfer arm 32 therein illustrated (the rear arm on the opposite side of the oven being similar) is provided with two similar hooks or cradling members 36, 37, each pivotally attached to the arm at 38, 39 respectively. The hooks 36, 37 are symmetrically arranged with respect to the respective fingers 34 at the ends of the arms and both hooks will assume a given relation with respect to the associated finger 34 in any given position of rotation of that finger. Hence, viewing Fig. 3, as a tray 27 on the lower run of the chain moves to the left from a position not therein shown, to the position wherein the forward roller 30 is directly beneath the shaft 33, the hook 36 will be in the lowermost dotted line position shown in said figure, that it will be in engagement with the roller. As the tray 27 moves to the position of tray identified as 27a, the hook 36 being in engagement with the roller 30 will actually lift the forward roller from the lower track to the same extent and at the same rate of elevation as the axial pin 28 is being arcuately elevated in moving about the sprocket 15. The effective radius of arm 32 is the same as the effective radius of the sprocket and hence the tray is maintained in a horizontal relation as it is moved arcuately upwardly as described. When the arm 32 has reached the intermediate horizontal position shown in dotted lines, the tray will be in the position identified by tray 27c and during the arcuate movement of the tray from the lower track through the lower left quadrant to the position of tray 27c, the forward roller 30 will have been retained or cradled within the hook member 36. During the movement of the finger 34, through the next quadrant, that is, from the intermediate horizontal left hand position of Fig. 3 to the vertical position, the finger adequately supports the roller 30 and the hook progressively backs away from the roller during such movement of the finger. In substantially the upper vertical position of the arm 32 the tray will occupy the position designated 27b, the roller 30 will move from the end of arm 32 into rolling contact with the upper track 22, the roller having been released from engagement by the hook due to the withdrawal or retarded movement of the latter just described and illustrated in dotted lines in Fig. 3.

Substantially concurrently with the horizontal rolling movement of roller 30 upon the track 22, the rear end of the tray, as represented by the pivot pin 28, also moves into the track 22 for stablized movement by the track throughout the upper run of the conveyer. During the movement of the finger 34 from the upper vertical position to the lower vertical position the associated hook 36 likewise performs no function since within that portion of the cycle the finger carries no load but the other hook and finger however will be elevating the forward end of the succeeding tray as described above.

The spacing of the trays and the relation of the parts participating in the transfer of the trays as described are such that the hooks 36 and 37 alternately engage forward tray rollers for cradling the rollers during movement of the associated finger from lower vertical to horizontal position and by a retarding action imparted to the hooks during movement in the second quadrant, the fingers only support the forward rollers. Hence as each tray moves into position where the rear pivotal axis thereof begins to move about the rear sprockets 15, the forward end of the respective trays will be engaged by one pair of the hooks 36, 37 and in cooperation with the respective fingers of the transfer arms will retain the trays in horizontal relation during the movement from one horizontal run of the conveyer to the other.

The means for controlling the operation of the hooks 36, 37, which as stated are pivotally attached to the arm 32 at 38, 39 respectively comprises a link 40 for each rear stabilizing mechanism, which links are generally ring shaped with openings 40a of sufficient diameter to receive the respective shafts 33 and the hubs 32a of the arms 32 and permit movement of the links relative to said hubs. To a link 40, a cooperative pair of hooks 36, 37 is pivotally attached by pins 41, 42, respectively. The pins 41, 42 extend from the hooks 36, 37 through the adjacent portions of the links 40 and are provided at the ends with rollers 43, 44 which roll upon the external peripheral surfaces of a disc shaped plate-cam 45 that is non-rotatably supported by means of brackets 46 to the slidable structure 20 whereby the parts described maintain cooperative relation with respect to the shaft 18 during expansion and contraction of the chains 13.

The cam 45 is provided with an aperture 45a through which the associated shaft 33 extends, the cam, as stated being non-rotatable. The various diameters of the cam, considering the axis of rotation of shaft 33 as the cam center, are approximately equal but various portions of the surface of the cam periphery along which rollers 43, 44 travel are of different configuration whereby the hooks 36 and 37 are constrained to move into the operative position of hook 36 of Fig. 3 whenever either hook 36 or 37 is disposed in the lower left quadrant of rotation shown in Fig. 3. The rollers 43, 44 being connected to the link 40 by pins 41 and 42 and the latter being carried by the hooks, constrain the latter to move pivotally about their axis pins 38, 39 into the operative lower left quadrant position of Fig. 3 and into inoperative positions during the remaining positions of the cycle.

In Figs. 5 to 9 inclusive, which disclose cam operated hooks for the forward portion of the oven, the functioning of the hooks is more clearly shown, the novel transfer structures at the front being identical in principle to the transfer means at the rear of the oven.

Referring to Figs. 5 to 8 inclusive there is therein shown one of the two transfer means associated with the front sprockets 14 for retaining the trays in stabilized relation as the pivotally mounted rear ends of the trays move in succession about the sprockets 14 in moving from one horizontal run of the conveyer to the other.

In Fig. 5 a tray 27, indicated as 27e for identification of position, is shown with its forward tray roller 30 in position to move off the end of the upper track 22, it being assumed that the forward sprocket 14 is rotating in a clockwise direction. A forward transfer arm 47 is shown in vertical position with a finger 48 in a substantial contacting position with the roller. A similar finger 49 is provided at the opposite end of the arm. As the sprocket 14 continues its clockwise movement, the rear end of the tray 27e will begin to move arcuately about the sprocket while the forward end of the tray will begin a like movement and the tray will be retained in horizontal relation by reason of the fact that the effective radius of the arm 47 is the same as that of the sprocket 14. The finger 48 will adequately support the roller 30 during movement during the first quadrant of 90° of arc from the vertical position shown to a horizontal position and hence during such movement the hook 50, similar to those above described, is in a non-engaging or inoperative position. A similar hook 51 is provided at the other end of the arm 47. The hooks 50, 51 like those described above, are swingably secured to the arm 47 by pivot members 52, 53, and to the hooks a ring-like link 54 is pivotally secured at 55, 56 respectively. The pivotal pins 55, 56 as shown in Fig. 9, extend from the respective hooks through the link and at their other ends carry rollers 57, 58 that are arranged to follow the peripheral surface of a disc-like cam 59 that is secured, as by a tubular bracket 60, to a plate 61 that, in turn, is secured to the upper and lower tracks 22 and 23. The link 54 and the cam are, as those at the rear of the conveyer, ring-like to provide recesses that accommodate the hub of the arm 47 and the stub-shaft 62 of the arm which is appropriately journalled in the framing of the oven. The shafts 62, there being one on each side of the oven in association with the corresponding sprockets 14, are driven in unison with the sprockets as by chains 63 from sprockets upon the respective front sprocket shafts 16.

Referring to Fig. 6, the arm 47 is shown in a position a few degrees of arc from the position shown in Fig. 5 with the tray now identified as 27f lowered slightly from said position while in Fig. 7 the tray there identified as 27g is shown in intermediate relation. As the tray 27 was carried into the horizontal relation of Fig. 7, the hook 50 was cam actuated into engaging position with respect to the roller 30 since as the finger 48 approached the horizontal position its effectiveness as a support for the roller was reduced by change of relation. In Fig. 7 the hook cradles the roller 30 and prevents the tray from slipping forwardly, or to the right, and thus moving out of stabilized horizontal relation. The hook 50 was moved from the position of Fig. 5 to the position of Fig. 7 by the cooperation of the rollers 57, 58 and connecting link 54, the rollers having followed the cam surface in moving from their positions in Fig. 5 to their positions in Fig. 7. During the movement of the tray from the horizontal position 27g, through position 27h of Fig. 8 to the lowermost position of Fig. 5, the cam will, by reason of the configuration of the dwells over which the rollers travel during such arcuate movement, retain the hook 50, as well as hook 51, in the same relative positions with respect to the arm as are shown in Fig. 7. Hence the roller 30 is effectually cradled or supported by hook 50 and longitudinal shifting of the tray is prevented by the roller engaging hooks during the movement of the tray from the position of Fig. 7 to the lowermost position indicated at 27i in Fig. 5. During the preceding 90° of arcuate movement, that is in the movement of the tray from the position of Fig. 5 to the position of Fig. 7, the end of the arm 47, including the associated finger 48 adequately cradled or supported the roller 30 to provide the desired stabilization of the tray.

It will be apparent that upon reverse movement of the conveyer resulting in the rotation of the front and rear sprockets and front and rear transfer arms in directions opposite from those above described, the same timed movement of the respective hooks will occur. For example in Fig. 3, if the sprocket 15 be assumed to move counterclockwise, the upper end of the transfer arm 32 will receive and support the forward tray roller 30 until it has been moved approximately to the horizontal position identified as 27c when the hook 37 will have moved, by cam action, into cradling relation with the roller and will be retained in that relation by the effective cam dwells until the tray has moved into rolling contact with the lower track, that is, until the arm 32 is in the vertical position whereupon the hook 37, then in the lowermost dotted position of Fig. 3, will by reason of the then effective portion of the cam surface, move counter clockwise at a rate to free the roller for rolling contact to the right along the lower track 23.

In like manner the forward stabilizing mechanism will be operated when the forward sprockets 14 rotate counter clockwise, as viewed in Figs. 5 to 8 inclusive. In that instance Fig. 6 illustrates the hook 51 approaching the roller as the latter moves toward the position of Fig. 5. In Fig. 5 the hook 51 is in engagement with the roller and will lift and cradle it during the next 90° of arcuate movement to the position of Fig. 7. From the latter position, by counter clockwise movement to the position of tray 27e, the hook will be retarded, in effect, by clockwise movement on its pivotal axis since during such movement the supporting end of the arm will support the roller adequately.

Since the upper portions of the arms 32 and 47 extend above the level of the upper tracks and below the level of the lower tracks when the arms are in vertical position, cut outs at the inner margins of the tracks are provided for such movement as well as for accommodating the movement of the hooks below the level of the lower tracks when the hooks are in the positions indicated in dotted lines in Fig. 3 and in Fig. 5. In Fig. 2 for example the rear or right hand end of the upper tracks 22 are shown provided with cut outs or notches 64 on the inner rear edges to provide clearance for the rotary transfer arms 32. A deeper notch 65 in each rear portion of the upper track is provided to permit the rollers 30 to be carried arcuately downwardly or upwardly (depending on the direction of rotation of the conveyer) as the rear ends of the trays move arcuately immediately from or toward the level of the upper track under control of the rear sprockets 16.

To provide required clearance for the transfer mechanism adjacent the rear ends of the lower tracks 23, the latter are provided with cut outs or openings 66 through or into which the fingers of the rear transfer arms 32 and the associated hooks may pass as they move into engagement with forward rollers 30 as shown in dotted lines in Fig. 3. In Fig. 2 the openings 66 are shown bounded on the inner sides by inward track extensions 67 that are welded to the inner edges of the tracks 22 to provide greater supporting areas for the rollers 30 at the position of pick-ups by the hooks or release thereof, depending on the direction of operation of the conveyer.

At the forward end of the upper tracks, cut outs or openings 68 therein are provided for accommodating the upper portions of the forward chain sprockets 14. Such openings 68, in the forward portions thereof extend to the inner edges of the tracks to provide passage 69 to permit the tray pivots 28 to move downwardly from the tracks, or upwardly through the tracks, as the trays begin or terminate respectively their arcuate movements at the forward end of the conveyer. Such passages 69 would of course permit the forward rollers 30 of the trays to drop as they move along the upper tracks at the forward ends of the upper tracks but to enable the rollers 30 to pass over the passages or gaps 69 in the upper tracks, supplementary rollers 70 are provided on the upper tracks which engage the side edges of the trays before the rollers 30 arrive at the gaps and hence prevent the forward ends of the trays from tilting downwardly by reason of the passage of the rollers 30 over the gaps 69.

In the forward end portions of the lower tracks 23, cut outs or passages 71 are provided for accommodating the ends of the transfer arms 47 and the associated hooks 50, 51 as those portions move into and from the lowermost positions for engagement with or disengagement from the front rollers 30, depending on the direction of rotation of the arms.

By reason of the action of the cam controlled hooks which are carried by the transfer arms as above described, the forward ends of the trays are positively engaged by the hooks in those positions within which the fingers of the transfer arms would be ineffective in lifting or supporting the tray ends or might not restrain longitudinal shifting movement of the trays to provide the desired positiveness of support or security. The cam controlled mechanism including the described cooperating pairs of cam followers on each pair of hook members and the links connecting each pair of hook member, avoids the use of springs or spring actuated catches or latches within the heated chamber. The cam followers of each pair of followers being linked together are operated cooperatively by the respective cams to provide positive shifting of the respective links and hence positive movement into and retention of the hooks within their respective positions during each cycle of rotation of the transfer arm. The transfer mechanism, as will be seen, actually transports the trays bodily throughout their paths of arcuate movement without use of cooperating stationary mechanism, such as curved tracks or the like, that by friction, vary the resistance to the movement of the trays through their arcuate paths and thus produce irregularities in the action of the trays.

The cam controlled gripping means for the trays hereinabove described may be employed at both ends of the conveyer, as shown, or at either end. For example, the described mechanism can be employed at one end and a different type transfer mechanism may be employed at the other end in instances where such arrangement may be desirable.

While a structure illustrative of the improvements has been shown and described, variations in the details thereof may be utilized within the spirit of the invention.

I claim:

1. Stabilizing apparatus comprising a rotary transfer arm having ends upon which portions of arcuately movable trays are adapted to be supported during portions of the arcuate movement thereof, and means for retaining said tray portions in the same relative positions with respect to said ends during the remaining portions of said arcuate movements of the trays comprising hook members pivotally secured to said arm and adapted to engage said tray portions during said remaining portions of said arcuate movements, and means comprising a cam for actuating said hook members into and from said engaging positions in timed relation with respect to the movement of the arm ends through the respective portions of said arcuate movements.

2. Stabilizing apparatus comprising a rotary transfer arm, a pair of hook members pivotally secured to said arm and arranged to be swung into and from operative positions with respect to the ends of said arms within particular portions of the paths of travel of said ends, a shiftable link member pivotally secured to each of said hook members for swinging the same upon the respective pivots to and from said operative positions, a fixed cam, and a pair of cam followers each associated with one of said hooks for following the surface of the cam during rotation of said arm and each operatively connected to said link for constraining said hooks to move in unison into and from said operative positions sequentially during rotation of said arm.

3. Stabilizing apparatus comprising a rotary shaft, a transfer arm mounted thereon and having opposed load supporting ends movable about said shaft, a pair of load engaging hook members each pivotally secured adjacent an end of said arm and swingable to and from an operative position with respect to the respective arm ends, a shiftable link member pivotally secured to each of said hooks for effecting concurrent swinging movement of said hooks upon shifting movement of the link member, a pair of opposed cam followers each operatively secured to said link, and a cam having a cam surface positioned for operative contact by said followers for shifting said link in directions for swinging said hooks in unison into respective operative positions sequentially during rotation of said arm.

4. Apparatus of the class described comprising a rotary shaft, a transfer arm mounted thereon for rotation thereby and provided with load carrying ends equally spaced from said shaft, a pair of hook members each pivotally secured to the arm adjacent an end thereof and swingable into operative load supporting positions with respect to the respective arm ends, cam followers operatively connected to said hook members for effecting the swinging movement thereof, a cam comprising a peripheral cam surface, and a link operatively attached to said followers for retaining the same in contact with said cam surface during rotation of said arm for constraining said hooks to move positively into and from the respective operative positions thereof.

5. Apparatus of the class described comprising a rotary shaft, a transfer arm mounted thereon for rotation thereby and provided with load carrying ends equally spaced from said shaft, a pair of hook members each pivotally secured to the arm adjacent an end thereof and swingable into operative load supporting positions with respect to the respective arm ends, cam followers operatively connected to said hook members for effecting said swinging movement thereof, a cam, and a link operatively attached to said followers for constraining the same to follow the cam during rotation of said arm whereby the followers coact each with the other for preventing pivotal movement of either hook beyond the respective load supporting position under influence of the load thereon.

6. Apparatus for supporting in horizontal relation arcuately movable trays pivotally secured to opposed portions of a pair of endless conveyer chains arranged to pass over end sprockets at the ends of the conveyer comprising a pair of rotary transfer members cooperatively positioned adjacent each pair of sprockets and having ends for supporting opposed portions of the trays during portions of said arcuate movement thereof, a pair of cradling members pivotally mounted on each of said transfer members for engaging said opposed portions of the trays for supporting the same during another portion of the arcuate movement thereof, means linking the cradling members of each pair together for movement in unison about the respective pivotal mountings thereof, a cam associated with each transfer member, and cam followers supported by each pair of said cradling members and revoluble by the latter about the respective cam in contact with the same whereby the cam effects movement of the respective cradling members alternately into and from operative tray supporting positions.

7. Conveyer mechanism comprising a pair of spaced apart parallel endless chains having horizontal runs, sprockets at the ends of the chains over which the same pass, tracks supporting the horizontal runs of said chains, a plurality of trays disposed between the chains and each being provided with pivotal members securing the trays to opposed portions of the chains, a pair of oppositely extended rollers carried by each of said trays for engaging portions of said tracks for cooperation with said pivotal members in supporting the trays upon said tracks as the trays move therealong, and rotary transfer means adjacent the sprockets at the ends of the chains for engaging portions of successive trays at points spaced from the pivotal members thereof for retaining the trays in horizontal relation as said pivotal members move about the respective sprockets, said rotary transfer means comprising rotary arms having receiving means for the engaged portions of the trays, means for retaining said tray portions in said receiving means during portions of the arcuate movement of the trays from one run of the conveyer to the other, and cams for actuating said retaining means into and from operative positions with respect to the respective receiving means.

JOHN R. NALBACH.